ELECTRONIC STORAGE ARRANGEMENTS

Filed Oct. 30, 1951 2 Sheets-Sheet 1

George Thomas Baker by Dezsoe Steinberg
attorney

George Thomas Baker
by Dezsoe Steinherz
Attorney

United States Patent Office 2,732,493

Patented Jan. 24, 1956

2,732,493

ELECTRONIC STORAGE ARRANGEMENTS

George Thomas Baker, Taplow, England, assignor to British Telecommunications Research Limited, Taplow, England, a British company Application October 30, 1951, Serial No. 253,840

Claims priority, application Great Britain November 4, 1950

5 Claims. (Cl. 250—27)

The present invention relates to storage arrangements for information in the form of electrical impulses and is particularly concerned with arrangements of the type where effective movement is continually taking place for the writing or reading of successive items of information and moreover regeneration may be arranged to take place. Known forms of such storage devices include mercury delay lines, cathode ray tubes and magnetic drums. The invention moreover relates more particularly to arrangements having storage devices which are used in common by a plurality of individual devices for receiving or supplying the information in question and it finds one useful application in connection with telecommunication equipment making use of an arrangement such as described in my Patent No. 2,686,225 granted August 10, 1954.

In this arrangement use is made of the fact that storage devices of the type contemplated are able to operate at extremely high speed, while in telephone systems as at present known the transmission of impulses normally takes place at a speed of approximately 10 per second. In consequence, if full advantage is to be taken of the high speed properties of the storage device, this can be shared by a number of individual devices on a time division basis. The above-mentioned patent describes in detail the use of a cathode ray tube as a storage device, and the individual devices are referred to as senders. With storage devices at present available and the amount of information likely to be required for the setting up of a telephone connection, it is convenient to arrange for a storage device to cater for about 10–20 individual devices. In a large telephone exchange, however, this number is not likely to be sufficient and consequently it is necessary to make use of a plurality of cathode ray tubes or other storage devices each serving its own group of senders. The chief object of the present invention is to secure economy in an arrangement of this type by providing control equipment in common to a purality of storage devices.

According to the invention, in an arrangement for associating a plurality of storage devices with a plurality of individual devices for receiving or supplying information, the individual devices are respectively assigned a definite portion of the storage capacity of their associated storage device and appropriate individual devices are associated simutaneously with the respective storage devices under the control of equipment common to a plurality of storage devices.

Figure 1:
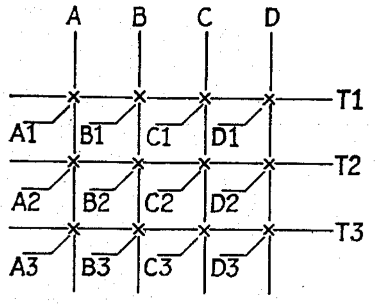
Figure 2:
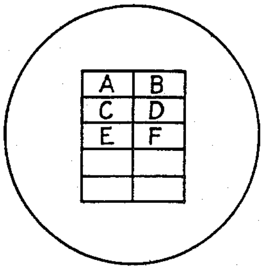
Figure 3:
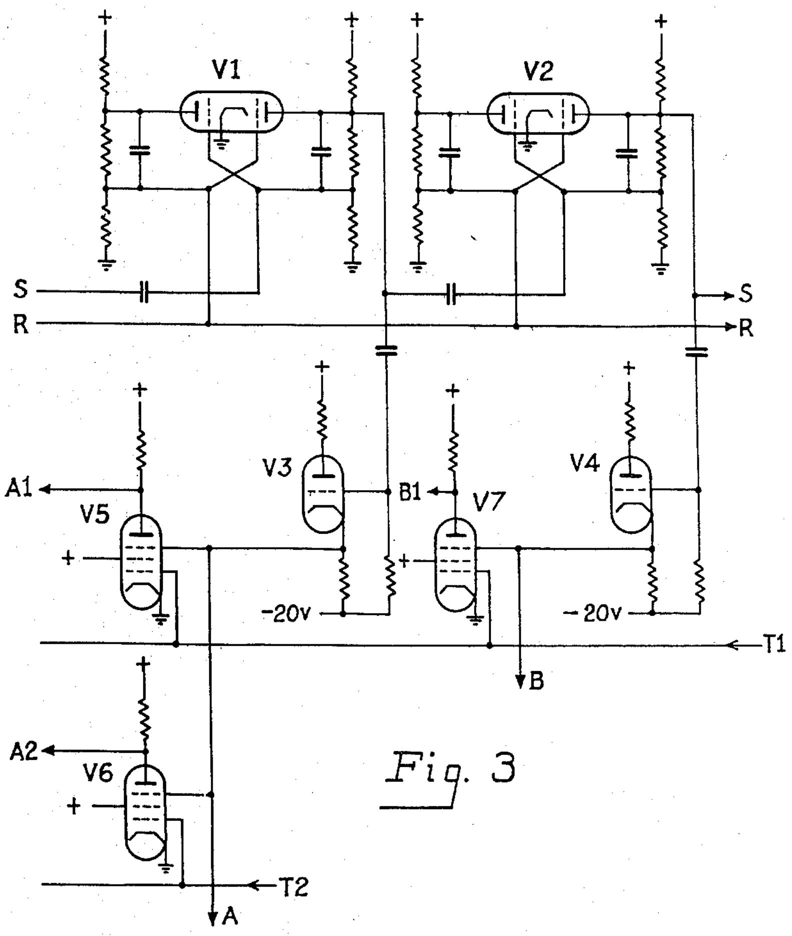
Figure 4:
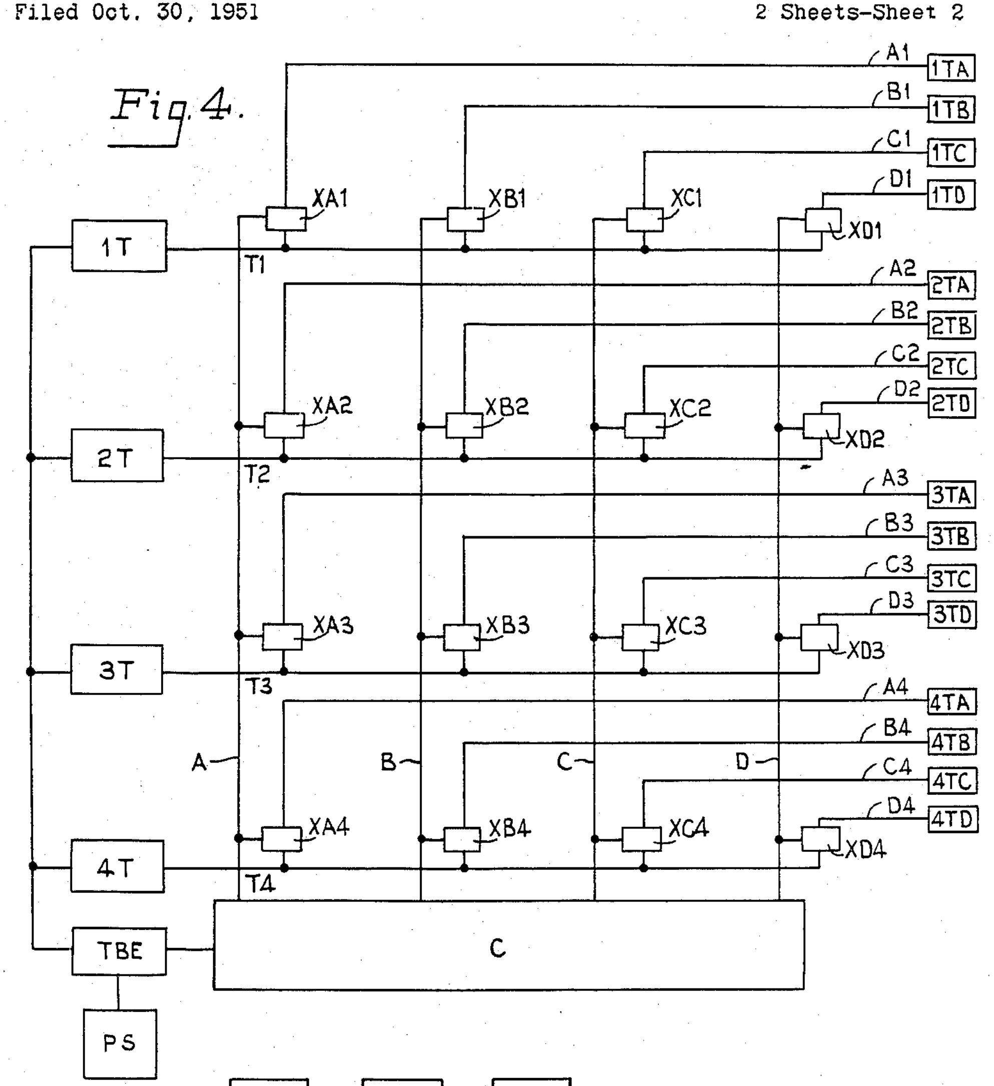
Figure 5:
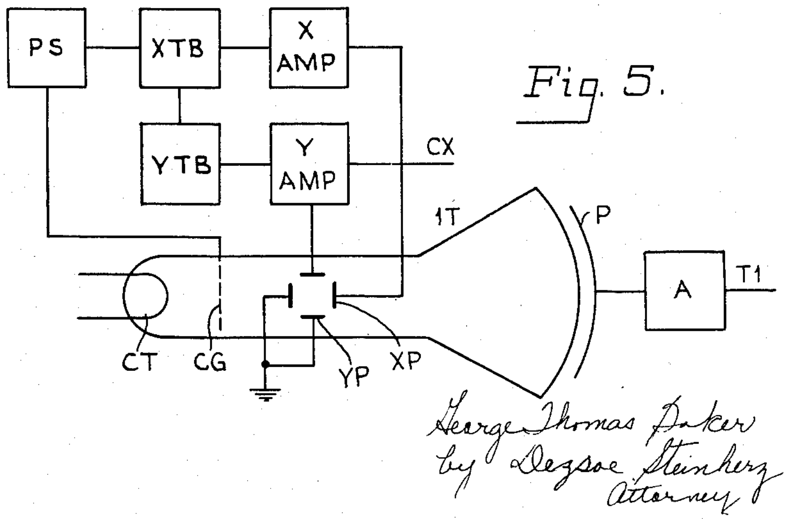

The invention will be better understood from the following description of one embodiment which should be taken in conjunction with the accompanying drawings comprising Figs. 1–5. Of these, Fig. 1 shows diagrammatically how the connections to the control equipment and the various circulating devices may be considered as forming a co-ordinate system with the individual devices located at the various intersections, Fig. 2 shows a possible arrangement for allocation of areas on the screen of a cathode ray tube, the number visualised in this case being 10, while Fig. 3 shows sufficient details of the actual circuit arrangements to enable the invention to be understood. Fig. 4 shows in greater detail the connecting arrangement generally indicated in Fig. 1, while Fig. 5 shows in schematic form the equipment used for controlling one of the cathode ray tubes. As in the above-mentioned earlier specification, the storage device is assumed to be a cathode ray tube but it will be understood that other types of storage device may be employed. In the case of a magnetic drum the arrangement would generally be that one track would cater for a plurality of individual devices but that there would be a plurality of tracks which since they would have their own reading and writing heads would be in effect separate storage devices.

Referring first to Fig. 1, leads T1, T2 and T3 extend from the various cathode ray tube storage devices, the number of which will of course be chosen in accordance with the circumstances of any particular case. Leads A, B, C and D are control leads extending from the equipment which determines the particular area of the screen over which the beam shall be caused to sweep and the leads A1, A2, A3 . . . B1, B2, B3 . . . C1, C2, C3 . . . D1, D2, D3 . . . are connected to their corresponding individual devices. It will be understood that the area A on tube T1 is individual to the circuit A1; the area A of tube T2 is individual to the circuit A2, while the area B on tube T1 is individual to the circuit B1 and so on. The switches "X" at the intersections of the two groups of leads are closed by control pulses transmitted sequentially over the leads A, B, C and D. Thus when a pulse is transmitted over lead A for instance, the switches at the points of intersection of A with T1, T2 and T3 are simultaneously closed, the time base being arranged so that the area A on each tube is being scanned during the time that the switches associated with lead A are closed. The control pulse of lead B will follow that on lead A and will serve to connect the individual circuits B1, B2 and B3 to the leads T1, T2 and T3 at a time when the beams of the three tubes are scanning the B area.

In the rather fuller showing of Fig. 4, rectangles 1T, 2T, 3T . . . represent the cathode ray tube storage device, while receiving devices are indicated by rectangles 1TA, 1TB . . . 2TA, 2TB . . . 3TA, 3TB . . . 4TA, 4TB, 4TC, 4TD on the right. The switching points X of Fig. 1 are now shown as having switching devices XA1, XA2 . . . XB1, XB2 . . . XC1, XC2 . . . XD1, XD2, XD3, XD4. The control of the switching operation is effected by the common equipment. The pulse source PS controls the time base equipment TBE and this in turn controls the scanning operation of all the cathode ray tubes 1T–4T and of the common equipment C so as to give the required synchronous operation.

In Fig. 5 the cathode ray tube 1T is of the type commonly used provided with an electron gun structure diagrammatically represented by a cathode CT and a control grid CG together with a deflecting system comprising the plates XP and YP. The screen of the tube is provided with an external metallic plate P from which signals are passed by way of the amplifier A to lead T1. The operation of the tube is controlled from the pulse source PS which is connected to the control grid CG and also feed the X time base XTB. From this signals are passed to the amplifier X AMP from which they are applied to the X deflecting plates XP. The X time base also controls the Y time base YTB the output of which is passed to the amplifier Y AMP from which the signals are applied to the Y deflecting plates YP. The Y amplifier is also arranged to be controlled over the lead CX on the assumption that information is stored by vertical displacement of individual elements of the charge pattern as described in the specification, previously referred to.

In one suitable arrangement which is shown in Fig. 3, each of the switching devices at the intersections of the two sets of co-ordinates comprises a pentode valve such as V5, V6 and V7, the control grid of which is connected to the appropriate T1, T2 or T3 lead, while the suppressor grid is connected to the appropriate A, B, C or D lead. The screen grid is connected to a source of positive potential and a connection from the anode is taken to the appropriate individual circuit. In the absence of any transmitted information from the storage devices, a negative potential is connected to the T1, T2 and T3 leads and a negative potential is also normally applied to the A, B, C and D leads so that due to these negative potentials on the control and suppressor grids all the pentode valves are cut off. Information will however be transmitted from the storage devices over leads T1, T2 and T3 substantially continuously as the various areas are scanned but as long as the valves are cut off due to negative potential on the suppressor grids, this information will not be passed on to the individual circuits. If, however, a positive-going pulse is applied to the lead A and is therefore extended to the suppressor grids of one series of pentode valves, each valve will be enabled to pass current each time the corresponding T lead goes positive and thus there will be a corresponding change in the potential of the anode which will be extended to the individual devices.

In the arrangement shown the control pulses applied to the leads A, B, C and D are generated by a ring of toggle circuits or binary counters such as are now well-known. Each one comprises a double triode with the grids and anodes cross-connected in association with a number of resistors and capacitors. Fig. 3 shows only the valves V1 and V2 forming two of the toggle circuits but it will be understood that there will be as many toggle circuits as there are control leads and that the final one will be connected back to the initial one so as to form a ring. Thus each toggle is reversed in turn by potential connected over the S lead from the preceding toggle and resetting is effected over the R lead by means controlled by the time base circuits for the cathode ray tubes so that each circuit is in the set position for the time taken for the beam to scan the corresponding individual area completely. The output on the S lead from each of the toggle circuits is extended to a further valve connected as a cathode follower and it will be seen that valve V3 is associated in this manner with valve V1 and valve V4 with valve V2. The purpose of the cathode follower arrangement is to provide a low impedance circuit to avoid distortion owing to the possibility of the control wires being of a considerable length.

It will thus be seen that according to the invention it is only necessary to provide one control switching means regardless of the number of storage devices or of the number of individual circuits employed in any particular installation and by this means appreciable economy in components is secured.

I claim:

1. In an electronic storage arrangement, a switching arrangement comprising a plurality of similar high-speed storage devices located in proximity to one another and each having its storage capacity divided into a plurality of portions, switching means for selectively giving access to said different portions of storage capacity, a plurality of similar responding devices located in proximity to one another for receiving information from said storage devices and respectively individual to each of said storage devices, the responding devices associated with any storage device corresponding respectively to the different portions of storage capacity of said storage device, switching means individual to each of said responding devices for selectively associating the said devices with the corresponding storage devices, and control means common to all said storage devices for simultaneously controlling all said access switching means and all the individual switching means corresponding to similar portions of storage capacity of the different storage devices so as to ensure that any individual responding device is always associated with the same portion of the storage capacity of its corresponding storage device.

2. In an electronic storage arrangement, a switching arrangement comprising a plurality of similar high-speed storage devices located in proximity to one another and each having its storage capacity divided into a plurality of portions, continuously-operating switching means for successively giving access to said different portions of storage capacity, a plurality of similar responding devices located in proximity to one another for receiving information from said storage devices and respectively individual to each of said storage devices, the responding devices associated with any storage device corresponding respectively to the different portions of storage capacity of said storage device, continuously-operating switching means individual to each of said responding devices for successively associating the said devices with the corresponding storage devices, and control means common to all said storage devices for simultaneously controlling the operation of all said access switching means and all the individual switching means corresponding to similar portions of storage capacity of the different storage devices so as to ensure that any individual responding device is always associated with the same portion of the storage capacity of its corresponding storage device.

3. In an electronic storage arrangement, a switching arrangement comprising a plurality of cathode ray tubes of the memory type each including a screen, beam-forming means and means for causing the beam to scan the screen in two dimensions, a pulse source for controlling the scanning means to cause the beam to traverse different portions of the screen in turn, a plurality of responding devices individual to each of said cathode ray tubes for receiving stored information therefrom, switching means individual to each of said responding devices and corresponding to said different portions of screen for selectively associating the individual responding devices with said cathode ray tubes and control means common to all the said cathode ray tubes and controlled by said pulse source for simultaneously controlling corresponding ones of said switching means individual to the different cathode ray tubes so as to ensure that any individual responding device is always associated with its corresponding cathode ray tube while the beam is traversing the same portion of the screen.

4. A switching arrangement as claimed in claim 3 in which a pentode valve individual to each responding device is associated with each cathode ray tube, one grid of said valve being controlled from the screen of said tube and a second grid of said valve being controlled from said common equipment whereby if control is effective simultaneously on both of said grids an impulse is obtained from the anode of said valve to effect the operation of said responding device.

5. A switching arrangement as claimed in claim 4 in which the common equipment comprises a ring of thermionic toggle circuits each arranged to operate the succeeding one in the ring and thereupon to apply potential to the second grids of the appropriate pentode valves associated with all said cathode ray tubes.

References Cited in the file of this patent

UNITED STATES PATENTS

| | | |
|---|---|---|
| 1,714,971 | White et al. | May 28, 1929 |
| 1,745,071 | Wensley | Jan. 28, 1930 |
| 1,792,261 | White | Feb. 10, 1931 |
| 2,314,920 | Bumstead | Mar. 30, 1943 |
| 2,459,131 | Mesner | Jan. 11, 1949 |
| 2,561,051 | Den Hertog | July 17, 1951 |
| 2,563,589 | Den Hertog | Aug. 7, 1951 |
| 2,570,716 | Rochester | Oct. 9, 1951 |
| 2,594,731 | Connolly | Apr. 29, 1952 |